UNITED STATES PATENT OFFICE.

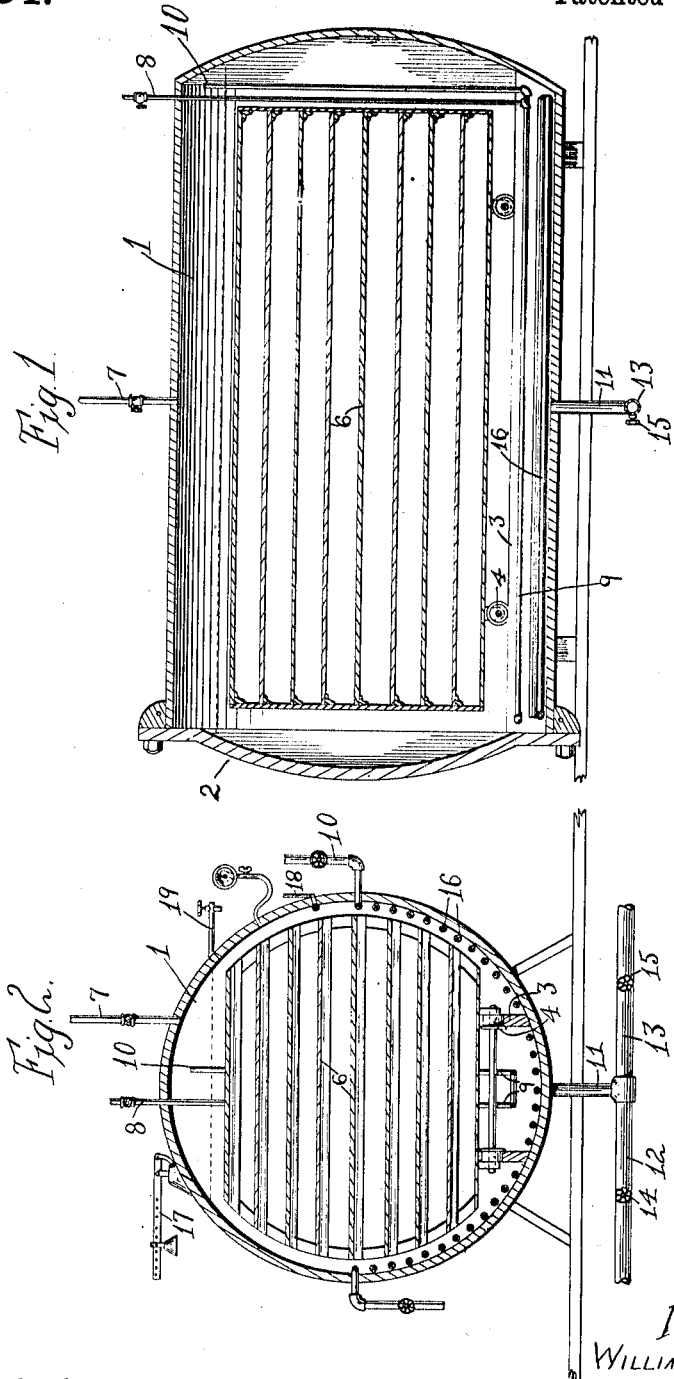

WILLIAM W. DUNCAN AND NELSON E. TOUSLEY, OF WATERTOWN, MASSACHUSETTS, ASSIGNORS TO HOOD RUBBER COMPANY, OF BOSTON, MASSACHUSETTS.

ART OF VULCANIZING RUBBER GOODS.

952,984.  Specification of Letters Patent.  Patented Mar. 22, 1910.

Application filed December 11, 1908. Serial No. 467,060.

*To all whom it may concern:*

Be it known that we, WILLIAM W. DUNCAN and NELSON E. TOUSLEY, citizens of the United States, residing at Watertown, Massachusetts, have invented certain new and useful Improvements in the Art of Vulcanizing Rubber Goods, of which the following is a specification.

Our present invention relates to improvements in the art of vulcanizing rubber goods, and more especially to the vulcanization of rubber foot wear.

The methods of vulcanization heretofore commercially practiced are divided into two general classes; first, by steam or mold pressure and heat; and second, by applying heat to the article without pressure, through air as a medium. By the first method cheaper grades of rubber may be used, vulcanization can be effected without the use of litharge, and a better wear resisting article can be produced for the same cost of stock, but such process is not applicable to rubber foot wear, as the cost of apparatus has heretofore been absolutely prohibitive.

In devising the present invention, we have aimed to produce a process and apparatus by which rubber goods such as rubber footwear and articles not adapted for being vulcanized by the steam mold process, could be made from the same vulcanizing compounds as heretofore in steam cures, economically and with much better results than are now secured with special vulcanizing compounds in the "open air process." We have aimed, by such process, to produce an article having a smooth outer surface capable of being varnished to give the necessary finish, to prevent blowing or blistering, to keep the lining dry, and to effect complete vulcanization. We have also aimed to reduce the time or period of vulcanization to a minimum, as thereby we materially reduce the cost.

In proceeding according to our invention, we form or build up the rubber foot wear upon lasts in the ordinary manner, using for this purpose metal lasts. In order to keep the lining dry during the vulcanizing, a tight joint must be made between the top of the shoe and the last. This we conveniently effect by the use of a rubber dam composed of a small strip of special rubber stock which does not cure under heat, but softens down so as to form a paste around the top of the shoe, sticking it to the last and forming a water tight joint.

We have discovered that the process of vulcanization and the quality of the cure depends largely upon the rate at which the stock can secure the necessary heat, as a certain amount of heat is absorbed by the rubber during vulcanization. We have found, however, that this heat must be applied in a special manner, as otherwise the moisture or air within the stock will be expanded, producing blisters and similar defects. We therefore place the lasts carrying the foot wear, sealed at the edges as above described, in a suitable chamber hermetically sealed, and while therein, subject them to the action of a heated fluid which is a good conductor of heat, such, for instance, as steam or water. The temperature of the heated fluid must be sufficient to secure the proper vulcanizing effect, and the pressure within the chamber must exceed the pressure generated by the action of the heat on any air or moisture within the body of the stock, as otherwise said moisture or air would expand and produce blisters. We have found that, by a temperature of approximately 280° F. and a pressure of about 80 pounds, vulcanization may be effected in the short period of about fifteen minutes, and that the articles produced have a smooth surface, and are free from blisters and defects of any kind. Were the warm fluid brought into contact with the articles before the pressure in the chamber had reached the proper amount, expansion of air between the stock and last or within the stock might produce detrimental effects, and when steam is the heating fluid, drops of water would condense on the surface of the stock. To avoid this, we first subject the stock within the chamber to the pressure of an inert gas, such as air, and while maintaining the pressure at the necessary amount hereinbefore referred to, introduce the heating fluid, causing it to displace the air and thereby heat the stock without any diminution of pressure or collection of water of condensation on the articles being vulcanized.

An apparatus for carrying out the above process is shown in the accompanying drawing, in which—

Figure 1 is a longitudinal section, and Fig. 2 a transverse section.

Referring by reference characters to this drawing, 1 designates a suitable chamber having a door 2 at one end designed to hermetically close the same. Within the chamber at the bottom are rails 3 upon which travel the wheels 4 of a truck carrying racks 6 for the support of the lasts. Air under the requisite pressure is admitted to the chamber through a pipe 7, and the heating fluid such as steam or water through pipe 8, which preferably forms a heating coil 9 before opening into the chamber at point 10. At 11 is shown an outlet pipe from the bottom of the chamber which communicates with branches 12 and 13, supplied with cocks or valves 14 and 15, one of these pipes constituting a water supply pipe in case it is desired to use water as the heating agent, and the other a pipe for carrying away the fluid at the completion of the operation. When water is used, it is desirable to provide additional heating means, such, for example, as the steam coils 16. A safety valve is shown at 17, thermometer at 18 and air valve at 19.

Having thus described our invention what we claim is:—

1. The hereindescribed method of treating articles made from vulcanizable gums, which consists in shaping them upon suitable forms, sealing them against access of fluid between the article and form, and then subjecting them to the action of a heated fluid under pressure to effect vulcanization, substantially as described.

2. The herein described method made for treating articles of vulcanizable gums, which consists in shaping them upon suitable forms, sealing them against access of fluid between the article and form, subjecting them to the pressure of a gas to hold them pressed tight against the form, and, while maintaining the pressure, introducing a heated fluid to expel the gas and raise them to vulcanizing temperature, substantially as described.

In testimony whereof, we affix our signatures in presence of two witnesses.

WM. W. DUNCAN.
NELSON E. TOUSLEY.

Witnesses:
C. H. ROPER,
ALFRED A. GLIDDEN.